Sept. 17, 1968   W. GÜNTHER   3,401,614
MIRROR REFLEX CAMERA
Filed June 27, 1966
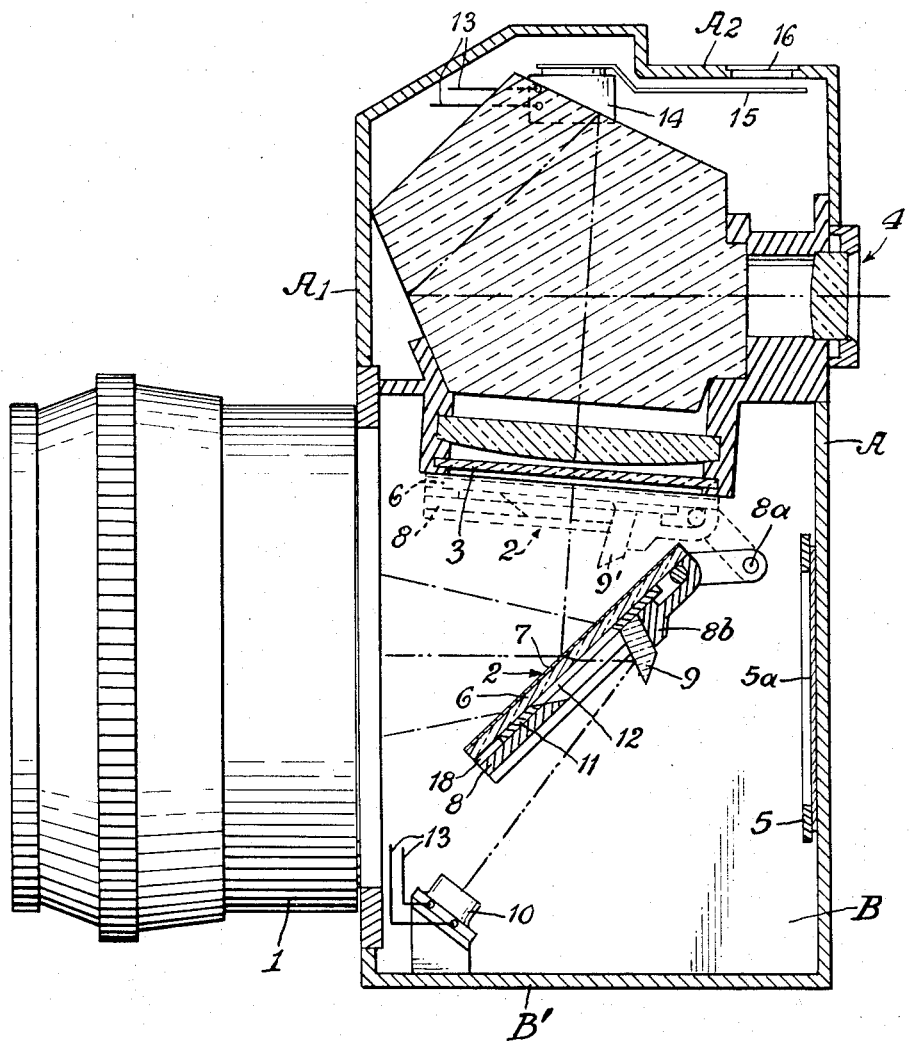

3,401,614
Patented Sept. 17, 1968

3,401,614
MIRROR REFLEX CAMERA
Willi Günther, Stuttgart-Mohringen, Germany, assignor to Zeiss Ikon Aktiengesellschaft, Stuttgart, Germany, a corporation of Germany
Filed June 27, 1966, Ser. No. 560,731
Claims priority, application Germany, July 3, 1965, Z 11,631
4 Claims. (Cl. 95—42)

The invention relates to a mirror reflex camera provided in the camera chamber, preferably on the bottom wall thereof, with a photoelectric element which is energized by light passing through the camera objective, which light is first directed onto ray deflecting means arranged in rear of the conventional pivotally mounted mirror which deflects most of the light rays into the viewfinder. This mirror in part is partially transparent for transmitting a portion of the light rays passing through the camera objective onto said ray deflecting means which in turn deflects the light rays onto said photoelectric element. The photoelectric element constitutes a part of an exposure meter associated with the camera.

The light measurement with the photoelectric element takes place when the pivotally mounted mirror is in the finder position, namely when the light rays entering the camera objective are deflected into the finder to produce therein a viewfinder image. In order to obtain a very bright finder image, the viewing of the same takes place when the diaphragm associated with the camera objective is fully open. The diaphragm closes down to the value determined by the light measurement briefly before the exposure of the film takes place. The exposure measurement therefore is independent of the diaphragm.

If such a mirror reflex camera is intended and equipped to be used with any one of a number of exchangeable camera objectives of different power, it is obvious that the exposure measurements will be different, depending upon whether the objective has a larger or smaller power. This requires that the exposure meter has to be adapted to the exchangeable objective attached to the camera.

In accordance with the present invention, this requirement is met by arranging a diaphragm having a conical aperture in the path of the measuring rays between the partially transparent mirror layer on the pivotally mounted mirror or the carrier plate for the same and the photoelectric element. The size of this conical aperture, when using exchangeable objectives of different powers, corresponds to maximum aperture of the objective having the smallest power or is smaller than the same.

Since the aperture of this conical diaphragm corresponds to the smallest power of the exchangeable objectives that may be used with the camera, it is only necessary to calibrate the exposure meter for this diaphragm value. Objectives having a greater power, namely a larger maximum light aperture, will then no longer influence the light measurement, even though its respective picture angle in dependence of its focal length will be considered in the measurement as desired.

The invention will now be described in greater detail with reference to the accompanying drawing, the single figure of which illustrates diagrammatically a side elevation view with parts in vertical section of a single lens mirror reflex camera equipped with the arrangement of the invention.

Referring to the drawing, the camera body A has attached to its front wall A1 an exchangeable camera objective 1. The light rays which pass through this objective into the camera chamber B are deflected by a pivotally mounted mirror 2, when the latter is in its operative or "finder" position, toward the focusing plate 3 of the viewfinder, so that a real finder image is produced in the plane of this plate which may be viewed by the finder device 4. When taking a picture, namely when exposing the film 5a, the pivoted mirror is pivoted upwardly into the position indicated by dash lines, so that all the light rays passing through the objective 1 may reach the diagrammatically indicated picture window 5 in rear of which is disposed the film 5a. The pivoted mirror 2 comprises a glass plate 6, the surface of which facing the objective 1 is covered with a partly transparent mirror layer 7. This layer 7 may extend over the entire surface of the glass plate 6 or may cover only parts of the same, while the rest of the glass plate 6 is covered by a totally reflective layer. In the latter case, the viewfinder image would have areas of different brightness, and for this reason it is preferable to have the entire surface of the glass plate 6 covered by a partly transparent layer 7.

The glass plate 6 is mounted on a carrier 8 which in turn is pivotally supported as diagrammatically indicated at 8a. The carrier 8 is also used to carry a deflecting mirror 9 which in the illustrated embodiment of the invention is fixedly attached to a projection 8b on the rear of the carrier 8 and in rear of the partly transparent layer. It is, however, also possible to mount the deflecting mirror 9 pivotally adjustable on the carrier 8. In the present embodiment a fixed attachment of the deflecting mirror 9 to the carrier 8 has been selected, because the deflecting mirror 9 in its inoperative position 9′ does not extend or cut into the beam of light which illuminates the picture window 5 when the mirror is in its inoperative position.

The deflecting mirror 9 deflects a portion of the light rays passing through the camera objective 1 and through the partly transparent layer 7 toward the photoelectric element 10 which is fixedly mounted in the camera chamber B on the bottom wall B′ thereof. The position of the photoelectric element 10 is determined by the condition that it should be placed at least approximately in a plane which is conjugate to the plane of the film 5a in the camera. The photoelectric element 10 is electrically connected by electric conductors 13 with a measuring instrument 14 whose movable indicator hand 15 is visible through a window 16 arranged in the top wall A2 of the camera body A.

On the rear face of the glass plate 6 is arranged a diaphragm plate 11 provided with an aperture 12 which in cross section is conical. This diaphragm plate 11 restricts the beam of light passing through the objective to a cross section which corresponds to the maximum aperture of the least powerful objective of a number of exchangeable objectives intended to be used with the camera. This diaphragm plate 11 may also be attached exchangeably on the carrier 8 by providing one side of the carrier with a slot 18 for insertion and removal of the diaphragm plate 11. It is then possible, if necessary, to replace the diaphragm plate 11 by one having a smaller conical aperture for use with a still less powerful camera objective. In such a case, however, the exposure meter would have to be recalibrated to this smaller diaphragm value.

The light measurement takes place with the diaphragm plate 11 in place independently of the exchangeable camera objective which has been attached to the camera. Such a light measurement corresponds to one taken with a customary manual exposure meter whose picture angle by attached diaphragms also determines the brightness of the illumination of the space in which the picture is to be taken independently of the camera objective used to take the picture. Of course, the exposure measuring instrument in the camera has to be calbirated to the selected diaphragm value which is determined by the aperture 12. With such an exposure measuring arrangementment the illumination is also correctly measured when objectives of greater power are used.

What I claim is:

1. A mirror reflex camera having an exchangeable camera objective arranged on the front wall of a camera body, a viewfinder, a pivotally mounted partly transparent mirror for reflecting a portion of the light beam passing through said objective into said viewfinder, a photoelectric element fixedly mounted inside said camera body on the bottom wall thereof, a light beam deflecting means disposed on the rear of said pivotally mounted partly transparent mirror for reflecting a portion of the light beam passing through said objective and through said partly transparent mirror onto said photoelectric element, and a diaphragm plate having an aperture which is conical in cross-section disposed on the rear face of said partly transparent mirror between the latter and said light beam deflecting means, the size of said conical aperture in said diaphragm plate is the same as the maximum aperture of the least powerful objective of the number of exchangeable objectives of different powers which may be used with the camera.

2. A mirror reflex camera according to claim 1, in which the size of said conical aperture in said diaphragm plate is smaller than the maximum aperture of the least powerful objective of the number of exchangeable objectives of different powers which may be used with the camera.

3. A mirror reflex camera according to claim 1, including a pivotally mounted carrier for holding said partly transparent mirror, said diaphragm plate and said light beam deflecting means, and means for inserting and removing said diaphragm plate into and from said carrier.

4. A mirror reflex camera according to claim 1, including a pivotally mounted carrier for holding said partly transparent mirror, said diaphragm plate and said light beam deflecting means, and a slot in one side of said carrier for slidably inserting and removing diaphragm plates of different apertures into and from said carrier.

References Cited

UNITED STATES PATENTS 3,093,044    6/1963    Lederer _____ 95—42

NORTON ANSHER, *Primary Examiner.*

C. B. FUNK, *Assistant Examiner.*